L. A. SANDOE.
HOE SEEDER.
APPLICATION FILED JUNE 23, 1909.
936,366.
Patented Oct. 12, 1909.
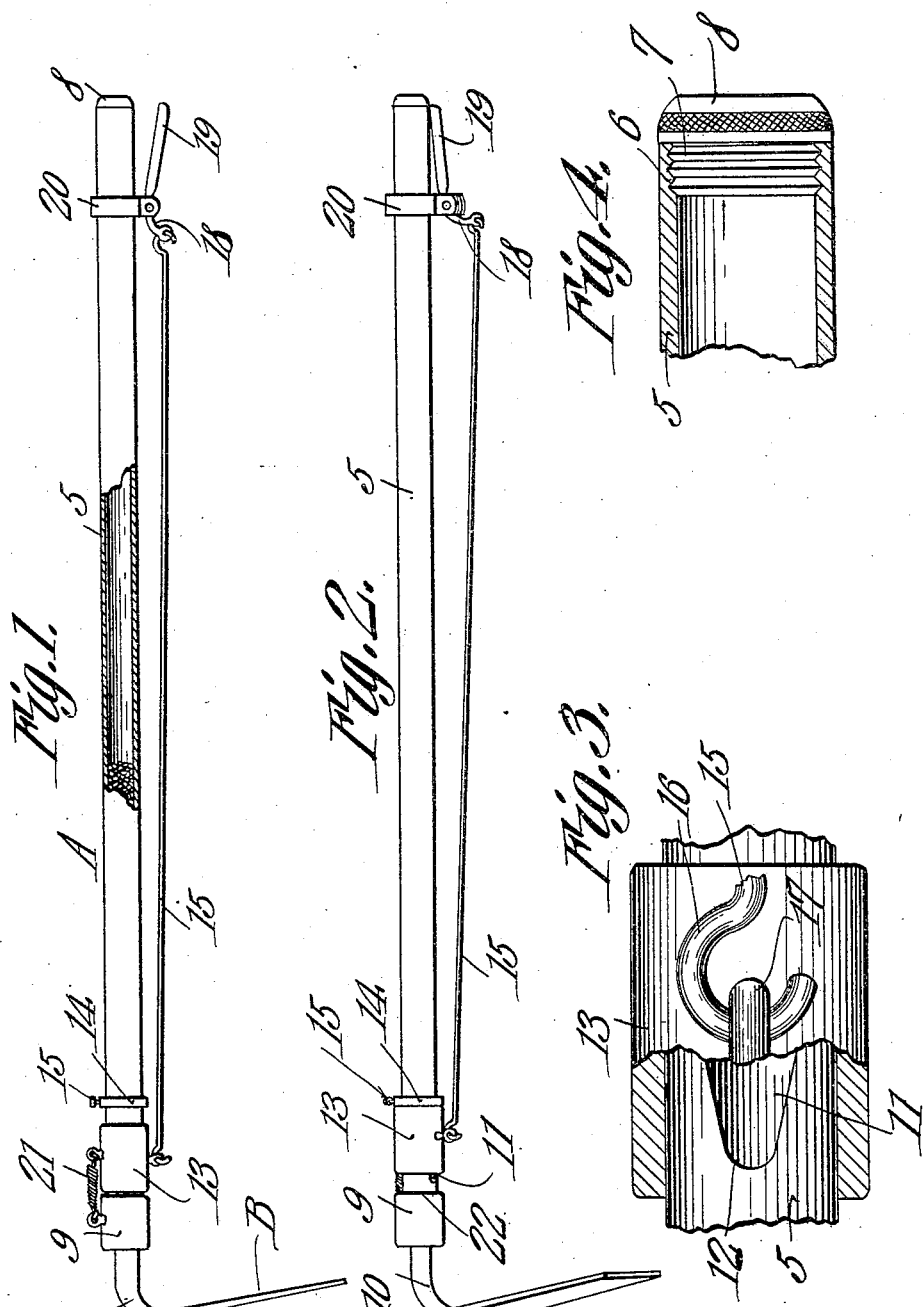
Inventor
Leroy A. Sandoe.
By C. A. Snow & Co.
Attorneys
Witnesses
Francis Boyle

UNITED STATES PATENT OFFICE.

LEROY A. SANDOE, OF HOPE, ARKANSAS.

HOE-SEEDER.

936,366.  Specification of Letters Patent.  Patented Oct. 12, 1909.

Application filed June 23, 1909.  Serial No. 503,955.

*To all whom it may concern:*

Be it known that I, LEROY A. SANDOE, a citizen of the United States, residing at Hope, in the county of Hempstead and State of Arkansas, have invented a new and useful Hoe-Seeder, of which the following is a specification.

My invention relates generally to seeders and planters, particularly to hoes, and has for an object to provide a device of this character in which the handle is the chamber or receptacle adapted to be filled with seeds with which to fill in or replant the "skips" in rows of corn, cotton, peas or similar plants.

Another object is to provide a device of this character in which the seeds are discharged, one at a time.

A further object is to provide a device of this character in which the seed outlet is adjustable to permit the discharge of various sized seeds.

A still further object is to provide a device of this character in which the means for operating the valve may be easily and quickly actuated by the operator without stopping his work.

In the usual form of seed planters, great difficulty is experienced in placing a certain defined number of seeds in the ground with one operation, either too many or too few being discharged and causing a great waste of seed and consequent unevenness in planting.

To overcome this disadvantage my invention embodies a substantially triangular shaped seed outlet in connection with a valve which can be so adjusted that only a certain defined portion of the seed outlet will be disclosed during each operation, the size of this opening being determined from the size of the seeds to be planted, the preferable size being that which will permit the seeds to drop out singly so that when the desired number has been discharged the valve may be closed and a further discharge of the seeds prevented.

With the above advantages and other objects in view which will appear as the nature of the invention is better understood, my invention embraces the construction illustrated in the accompanying drawing, described in the following specification and set forth in the appended claims.

In the accompanying drawing, Figure 1 is a side elevation of a hoe, constructed in accordance with my invention, showing the valve in normal or closed position. Fig. 2 is a similar view with the valve shown in operative or open position. Fig. 3 is an enlarged fragmentary detail of the lower end of the hoe handle showing the valve partly broken away to expose the seed outlet. Fig. 4 is an enlarged sectional detail of the upper end of the handle, showing the cap in end elevation.

In a more detailed description of my invention in which similar characters of reference designate like parts wherever they occur in the views shown, the letter A designates the handle of the hoe, and B the blade of the hoe.

The handle A comprises a hollow shank 5, the upper end of which is internally provided with screw threads 6 to engage the external screw threads 7 formed on the cap 8. This cap forms a stopper or closure for the bore of the handle and is removable therefrom in order to permit the handle to be filled with seeds. The opposite end of the handle terminates in an enlargement 9 adapted at one end to engage the goose neck 10 of the blade in any preferred manner.

Formed in the hollow shank 5 adjacent the enlargement 9 is an opening 11 communicating with the bore of the shank and which will hereafter be referred to as the seed outlet. The seed outlet 11 is substantially triangular in outline, the narrower portion of the triangle being turned toward the blade of the hoe, and being preferably rounded in outline, as shown at 12, in order that there will be no rough surfaces to impede the discharge of the seeds or cause the same to choke or clog the seed outlet. This seed outlet is preferably made of sufficient size to permit the smaller seeds, as for instance peas, to roll out singly from the narrowest portion of the outlet. The inclined sides of the outlet permit the larger seed to be discharged in like manner as a greater portion of the outlet is exposed.

Slidingly mounted on the shank of the hoe adjacent the seed outlet is a valve 13, the purpose of which is to normally close the seed outlet, but which is adapted to be slid over the shank of the hoe so that a certain defined portion of the seed outlet will be exposed to permit the discharge of the seeds. This valve in operation increases or diminishes the amount of opening of the seed outlet as the seeds run large or small, and in operation will expose only a sufficient amount of opening to permit a single seed to be discharged through the opening at one time.

For limiting the movement of the valve 13 so that a predetermined portion of the valve outlet will be exposed, a stop collar 14 is provided. This stop collar is slidingly mounted on the shank of the hoe and may be adjusted to any desired position thereon by means of a set screw 15. The valve 13 when abutting this stop collar will expose only a certain portion of the seed outlet, the amount of opening being determined by the position of the sliding collar 14. For operating this valve a pull rod 15 is provided. This rod is connected at one end to the valve 13 in any preferred manner, the connection in this instance being effected by passing the hook 16 of the pull rod through an eye 17 formed on the lower surface of the valve. The opposite end of the pull rod is preferably connected to a lever 18 having an extension 19 constituting a convenient grip for the hand of the operator. This lever is pivotally secured to the handle by a strap 20 so positioned on the handle that the hand of the operator need not be raised during the operation of the lever, it being sufficient that the fingers be engaged over the grip in order to compress the grip to the handle, which movement will slide the valve and expose a certain portion of the seed outlet.

For the purpose of illustration and clearness a lever is shown for actuating the valve, however, it is not intended to limit the construction of the operating member to this form, as in practice the pull rod may be connected to a sleeve slidingly mounted on the shank of the handle which will operate just as efficiently and will, at the same time, simplify and cheapen the construction of the device.

In order to return the valve to its original position, upon the pull rod being released, a spring 21 is provided. This spring is secured at one end to the enlargement 9 and at the other to the valve 13, and in operation stores up energy as the valve is being opened to return the valve to its closed position, the movement of the valve in this direction being limited by abutting against the shoulder 22 of the enlargement 9.

From the above description, taken in connection with the accompanying drawing, it is thought that the construction and operation of my invention may be easily understood without a more extended explanation, it being understood that various changes in the form, proportion and minor details of construction may be made without sacrificing any of the advantages or departing from the spirit of the invention.

What is claimed is:—

1. A hoe having a hollow handle provided with an outlet adjacent one end, a valve surrounding said handle and adapted to open and close said outlet, means assembled with said handle for limiting the movement of said valve, and means for actuating said valve whereby to open and close said outlet.

2. A hoe having a chambered handle provided at one end with an outlet adapted to permit the discharge of its contents, a valve slidingly mounted on the said handle and adapted to normally close said outlet, stops carried by said handle for limiting the sliding movement of said valve, a pull rod engaging said valve and adapted to release the same from its normal position, and means for automatically returning said valve to its normal position.

3. A hoe having a handle provided with a longitudinal cavity, said cavity having at one end an outlet adapted to permit the discharge of its contents, a valve carried by said handle adapted to slidingly fit the shank thereof and operating to close and open said outlet, stop shoulders carried by said handle adapted to limit the sliding movement of said valve, a pull rod carried by said handle and operating to move said valve to expose a portion of said outlet, and a spring assembled with said handle and operating to return the valve to its initial position.

4. A hoe having a handle provided with a longitudinal cavity, a cap removably secured to said handle and forming a closure for the same, said cavity having an outlet opening through the shank of said handle adjacent the blade of said hoe, a valve surrounding said handle and adapted to be slid lengthwise the handle to expose a portion of said outlet, a lever assembled with said valve and adapted to slide the valve whereby to open said outlet, a stop collar adjustably mounted on said handle and adapted to limit the movement of said valve, a stop collar carried by said handle and adapted to limit the closing movement of said valve, and a spring connected at one end to said valve and at the other to said stop collar, and operating to return the valve to its initial position whereby to close said outlet.

In testimony that I claim the foregoing as my own, I have hereto affixed my signature in the presence of two witnesses.

LEROY A. SANDOE.

Witnesses:
W. M. CANTLEY,
W. E. BRIANT.